Feb. 9, 1965 P. BLISS 3,169,215
SOLENOID VALVE ACTUATOR
Filed Dec. 18, 1962
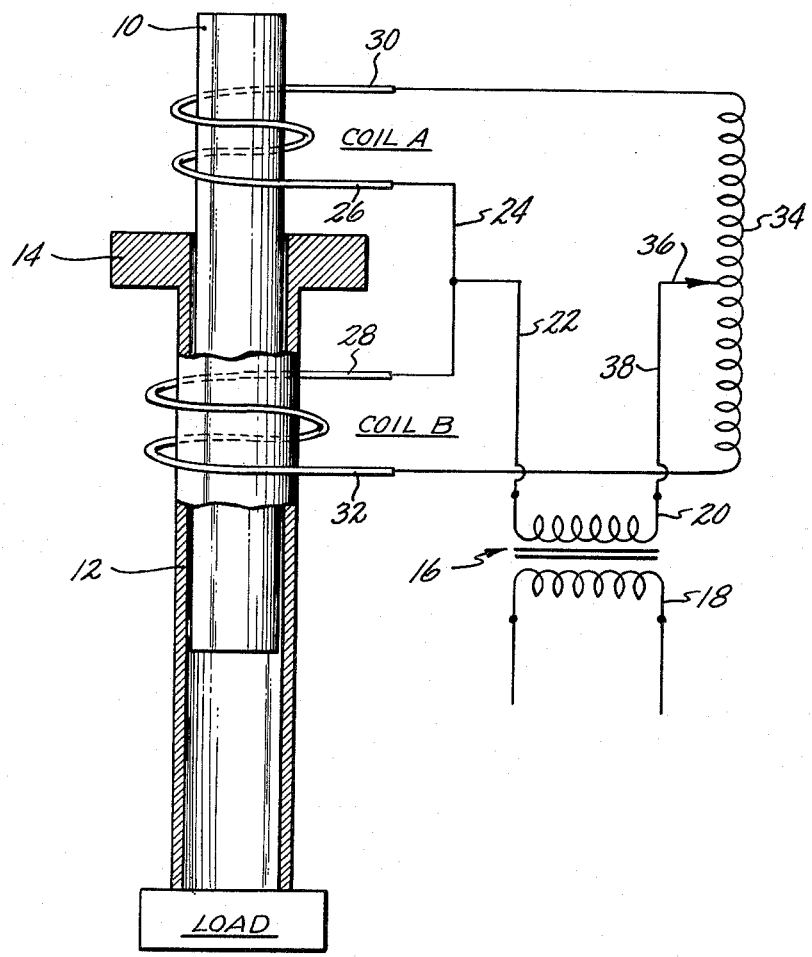
INVENTOR
PHILIP BLISS
BY M. B. Tasker
ATTORNEY

United States Patent Office 3,169,215
Patented Feb. 9, 1965

3,169,215
SOLENOID VALVE ACTUATOR
Philip Bliss, Newington, Conn., assignor to United Aircraft Corporation, East Hartford, Conn., a corporation of Delaware
Filed Dec. 18, 1962, Ser. No. 245,564
7 Claims. (Cl. 317—181)

This invention relates to a solenoid system for actuating the movable element of a valve or the like, and particularly to such a system in which the movement of the solenoid-actuated member is proportional to the current supplied to the solenoid.

The use of electric controls in process control applications is restricted by the lack of an electrical actuator, the position of which is a function of voltage or current.

Actuators are available, for example pneumatic and hydraulic actuators, wherein the pressures are controlled to provide a force balance on a diaphragm or a piston either with or without feedback arrangements such that the position of the actuator is a function of an applied control pressure. Such actuators, however, require fluid or gas systems which limit the application, particularly in remote areas or in radiation fields.

Electrical operators are available which generate the required forces by use of rotary motors and lead screws. In such devices the actuator position is not proportional to voltage or current but rather to the elapsed time of operation of the motor or in more sophisticated servos to the integral of voltage or current. In many cases this leads to complication of the control loop or to increased or impossible maintenance and lubrication of motor bearings.

The usual solenoid actuator does not lend itself to proportional action because the characteristics of the solenoid force do not stably balance the opposing forces of spring and load. The attractive force of the solenoid increases as the plunger moves into the coil, creating a tendency toward positive feedback and instability. Also since the solenoid force is unidirectional, it cannot balance an external force, such as the lift on the valve plug, for example, in a direction to aid the solenoid force. The net result of these characteristics is that if the current is sufficient to move the plunger at all, it is sufficient to complete the stroke. In other words, the usual solenoid valve is very satisfactory for on-off operation but totally unsatisfactory for throttling service.

A less well-known application of a solenoid is to provide a repulsive force rather than the usual tractive force due to electromagnetic attraction. In the repulsive solenoid, the solenoid coil becomes the fixed primary coil of a transformer of which the secondary coil is movable. When an alternating current is impressed on the primary coil, the fields of the primary and secondary coils repel each other and the secondary coil being movable is moved away from the primary coil. By using two such repulsive solenoids in opposition having a common secondary in a force balance system, a solenoid system can be provided which will generate a force on the movable secondary which is proportional to the current supplied to the two primaries.

It is an object of this invention to provide a solenoid system of this type in which the movement of the actuator is proportional to the current supplied to the solenoid coils.

A further object of the invention is to provide a proportional solenoid including opposing primary coils in which the force exerted on this common secondary is proportional to the current supplied to the primary coils.

A further object of the invention is generally to improve the construction and operation of the solenoid-operated actuators.

These and other objects and advantages of the invention will be pointed out in connection with the following detailed description of one embodiment of the invention which is illustrated in the accompanying drawing.

In the single, diagrammatic figure of this drawing the numeral 10 indicates an axial core which is fixed. Coils A and B are wound about the core 10 at spaced locations along the axis of the latter. These coils are also fixed. Preferably, the coils have identical geometries and number of turns. However, as will later appear, it is not absolutely essential that the coils be identical.

The fixed core 10 is surrounded by a sleeve 12 of non-magnetic material which is freely movable axially of the core. The sleeve 12 is the actuating member of the solenoid system and is connected to the movable element of the valve or other load which it is desired to control. Any convenient connection means may be employed for this purpose. In the drawing sleeve 12 is shown directly coupled to the load which is to be moved. A ring 14 of good electrically conducting material is provided at the upper end of sleeve 12 and as herein shown, is made integral herewith. Ring 14 comprises a single turn secondary for primary coils A and B and is located in the space between these coils and is free to move axially with the sleeve along the axis of core 10.

As herein shown, coil B is slightly larger in diameter than coil A in order to accommodate the sleeve 12 but this has no material effect on the operation of the two coils.

Means are provided to connect coils A and B with an alternating current power source, herein shown as a transformer 16 having a primary 18 and a secondary 20. One terminal of the secondary 20 is connected by conductor 22 to a conductor 24 joining leads 26 and 28 of coils A and B. The other leads 30 and 32 of coils A and B are connected to opposite ends of an inductance 34 which is connected through a manually operable slider 36 with the other terminal of secondary 20 through a conductor 38. It will be understood that the manually operable member 36 which is slidable along the inductance 34 can be operated by other means if desired. It will be obvious to one skilled in the art that inductance 34 can readily be replaced with a circuit using vacuum tubes, solid state devices, or magnetic amplifiers.

In the operation of this system if the coils A and B are identical and the device 36 is adjusted so that equal currents are flowing in coils A and B, the conducting ring 14 will be held in balance midway between the coils A and B by equal and opposite repulsive forces. If the ring be mechanically displaced, for example toward coil A, the repulsive force of coil A will be greater than that of coil B and the net force will tend to restore the ring to its balanced position. If the current is increased in coil A for example, the ring will be subject to a force moving it away from the coil A and this force will be proportional to the unbalance in currents and to the distance of the ring from its balanced position. Feedback is therefore negative and stable proportional movement of sleeve 12 is achieved.

It will be evident that any dissimilarity in the coils A and B can be taken care of by movement of the slider 36 to achieve a balanced condition of ring 14.

It will be evident from the above that a truly proportional solenoid system has been provided in which the movements of sleeve 12, which is attached to the movable element of a valve, for example, is equally proportional to the movements of member 36 which controls the current supplied to the coils A and B.

It will further be evident that by this invention a solenoid system has been provided which is admirably suited for controlling the movable member of a valve to obtain throttling movement.

While only one embodiment of the invention has been shown therein somewhat diagrammatically, it will be obvious that various changes in the construction and arrangements of the parts may be made without departing from the scope of the invention as defined by the accompanying claims.

I claim:

1. In a proportional solenoid, an axial flux concentrating core, two coils surrounding said core at axially spaced locations thereon, a conducting ring on said core between said coils, means for energizing each of said coils from an A.C. source to create respective repulsive forces on said ring in opposite directions, means for operatively connecting said ring to a device to be actuated, and means to vary the power input to one of said coils with respect to the other of said coils.

2. In a proportional solenoid, an axial flux concentrating core, two coils surrounding said core at axially spaced locations thereon, a conducting ring on said core between said coils, means for energizing each of said coils from an A.C. source to create respective repulsive forces on said ring in opposite directions, means for operatively connecting said ring to a device to be actuated, and means to increase the power input to one of said coils while simultaneously decreasing the power input to the other of said coils.

3. In a proportional solenoid, an axial flux concentrating core, two coils surrounding said core at axially spaced locations thereon, a conducting ring on said core between said coils, means for energizing each of said coils from an A.C. source to create respective repulsive forces on said ring in opposite directions, means for operatively connecting said ring to a device to be actuated, and electrical control means for moving said ring progressively in either direction from its centered position through a distance proportional to movements of said control means including inductance means for varying the power supplied to said coils.

4. In a proportional solenoid, an axial core, two spaced coils on said core, means for connecting said coils to an A.C. power source, said coils comprising primary coils, a conducting ring on said core between said coils, said ring comprising a secondary for both of said primary coils, whereby currents flowing in said coils tend to repel said ring, means for selectively varying the power input to each of said coils, and means for operatively connecting said ring to a device to be operated.

5. A solenoid system for actuating a valve or the like with a throttling action in which the motion of the valve is proportional to the current supplied to the solenoids in the system, comprising a fixed axial core, two fixed coils surrounding said core at spaced locations along the axis of the latter, a ring of electrically conducting material surrounding said core between said coils, means for connecting said coils to an alternating current power source, means for increasing the current supplied to either one of said coils while decreasing the current supplied to the other, whereby said ring will be moved progressively toward the coil receiving the lesser current a distance proportional to the variation in current supplied to said coils, and an operating connection from said ring to the valve to be actuated.

6. A solenoid system for actuating the movable element of a valve or the like through a distance proportional to the current supplied to the solenoids in the system, comprising a fixed axial core, two fixed coils surrounding said core at spaced locations along the axis of the latter, a ring of good electrically conducting material surrounding said core in the space between said coils and free for axial movement in said space, means for connecting said coils to an alternating current power source, whereby currents flowing in said coils tend to repel said ring, including means for selectively varying the current to each of said coils, and means for operatively connecting the movable element of the valve to be actuated to said ring.

7. In combination, two axially aligned coils supported in spaced relation, a core extended axially through said coils for concentrating the flux due to current flowing in said coils, a ring of electrically conducting material surrounding said core between said coils, said ring having an axial extension operatively connected to a movable member to be controlled, means for connecting each of said coils to an A.C. power source including a variable inductance having a movable element for selectively controlling the current supplied to said coils, whereby said axial extension is moved proportionally to the movement of said movable element.

References Cited by the Examiner

UNITED STATES PATENTS 2,555,520   6/51   Torre _____ 336—119
2,785,873   3/57   Holmes et al. _____ 317—181
3,113,280   12/63  Hobley _____ 336—129

JOHN F. BURNS, *Primary Examiner.*